United States Patent
Blumenau

(10) Patent No.: US 6,353,837 B1
(45) Date of Patent: Mar. 5, 2002

(54) METHOD AND APPARATUS PROVIDING MASS STORAGE ACCESS FROM SYSTEMS USING DIFFERENT META-DATA FORMATS

(75) Inventor: Steven M. Blumenau, Holliston, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/107,884

(22) Filed: Jun. 30, 1998

(51) Int. Cl.[7] .............................................. G06F 12/00
(52) U.S. Cl. ........................ 707/205; 707/10; 707/102; 713/201; 709/330
(58) Field of Search ................................ 707/205, 102, 707/10; 709/250, 330; 710/68; 711/202; 360/48; 713/201, 100

(56) References Cited

U.S. PATENT DOCUMENTS

| 5,239,647 | A | * | 8/1993 | Anglin et al. | 707/205 |
| 5,317,728 | A | * | 5/1994 | Tevis et al. | 707/204 |
| 5,483,647 | A | * | 1/1996 | Yu et al. | 713/100 |
| 5,553,285 | A | * | 9/1996 | Krakauer et al. | 707/1 |
| 5,734,865 | A | * | 3/1998 | Yu | 709/250 |
| 5,864,852 | A | * | 1/1999 | Luotonen | 713/201 |
| 5,991,862 | A | * | 11/1999 | Ruane | 711/202 |
| 6,018,779 | A | * | 1/2000 | Blumenau | 710/68 |
| 6,067,199 | A | * | 5/2000 | Blumenau | 360/48 |
| 6,167,458 | A | * | 12/2000 | Lim et al. | 709/330 |

OTHER PUBLICATIONS

Taylor et al., "A Pragmatic Test Data Management System," Test Conference 1991, IEEE, Oct. 26, 1991, pp. 338–344.*

* cited by examiner

Primary Examiner—Thomas Black
Assistant Examiner—Charles L. Rones
(74) Attorney, Agent, or Firm—John M. Gunther, Esq.; Leanna J. Fitzgerald, Esq.; Christopher K. Gagne, Esq.

(57) ABSTRACT

A method and apparatus for accessing storage from at least two different host computers features creating a first file having a first meta-data format and user data blocks in a mass storage medium using the first host computer and reading a logical to physical mapping of the user data blocks from the first file. A second file, having a second meta-data format, is created using a second host computer and the second file has blocks preallocated to be the same length as user data blocks of the first file. A logical to physical mapping of the preallocated user blocks is then obtained and the data blocks of the preallocated file are linked to the data blocks of the first file so that a reference to the preallocated blocks will provide an address at which the data requested can be read in the first file. In this manner, different meta-data blocks, corresponding to different filesystems, and/or operating systems, can be used in the respective first and second host computers.

12 Claims, 4 Drawing Sheets

METHOD AND APPARATUS PROVIDING MASS STORAGE ACCESS FROM SYSTEMS USING DIFFERENT META-DATA FORMATS

BACKGROUND OF THE INVENTION

The invention relates generally to the storage of data in mass storage systems, and in particular to the ability to access data in a mass storage system from different facilities using different, and often incompatible, filesystem formats.

As data processing systems grow in size and complexity, the ability to access user data from different facilities, or from different systems within the same facility becomes increasingly advantageous. On the other hand, however, different host systems, to the extent they use different operating systems, often have different and incompatible meta-data formats. Thus, when a Unix operating filesystem accesses user data, it uses a file request meta-data format which is different from, for example, a Windows based system access. Further, even when two Unix based systems access the same data, it is possible, and indeed not unlikely, that different host computers, to the extent that they use different versions of Unix, will not be compatible with each other. Accordingly, it would be advantageous to enable different operating systems to share the same user data even though those operating systems themselves had incompatible meta-data formats. This would provide the advantage of enabling a single copy of the user data to be easily used, updated, modified, etc., by users irrespective of the host operating system and filesystem, in a manner which is simply not practically available today.

There do, however, exist several data sharing systems. In one system, data is shared by keeping multiple copies of the user data, with the copies being periodically updated so they are synchronized to each other. This requires two copies of the data which will be more expensive because of the data storage space required. A second form of data sharing provides that two hosts, running the same operating system or "raw" device, access the user data where only one host can access the user data at the time. This requires, then, that the two hosts be limited to the same operating system or filesystem.

A third system, providing for so-called concurrent access, typically uses a distributor lock master and can be used in a clustered filesystem using a custom format. This system gets quite complex, and provides for inefficient CPU and network usage.

Accordingly, a more efficient and flexible system would be desirable to share the data without the need for special operating systems. This would enable different operating systems to access the same single copy of user data.

SUMMARY OF THE INVENTION

The invention relates to an apparatus and method for accessing storage from at least two different host computers having different operating system meta-data formats. The method of the invention features the steps of creating a first file having a first meta-data format and user data blocks in the mass storage memory, using a first host computer, reading a logical to physical mapping of the user data blocks from the first file, creating a second file having a second meta-data format using a second host computer, with the second file having blocks preallocated to be the same length as user data blocks of the first file, retrieving a logical to physical mapping of the preallocated blocks, and linking the data blocks of the preallocated file to the data blocks of the first file.

In an alternate embodiment, the method of the invention provides for indirectly storing data blocks from a computer and features the steps of creating a meta-data file identifying a file specification data, setting an indirect storage flag in the meta-data, writing in user data blocks an address identifying the corresponding indirectly stored data blocks, and accessing the indirectly stored datablocks using the indirect addresses.

BRIEF DESCRIPTION OF THE DRAWINGS

Other objects, advantages, and features of the invention will be apparent from the following description taken together with the drawings in which.

DESCRIPTION OF THE PREFERRED EMBODIMENT

Figure 1:
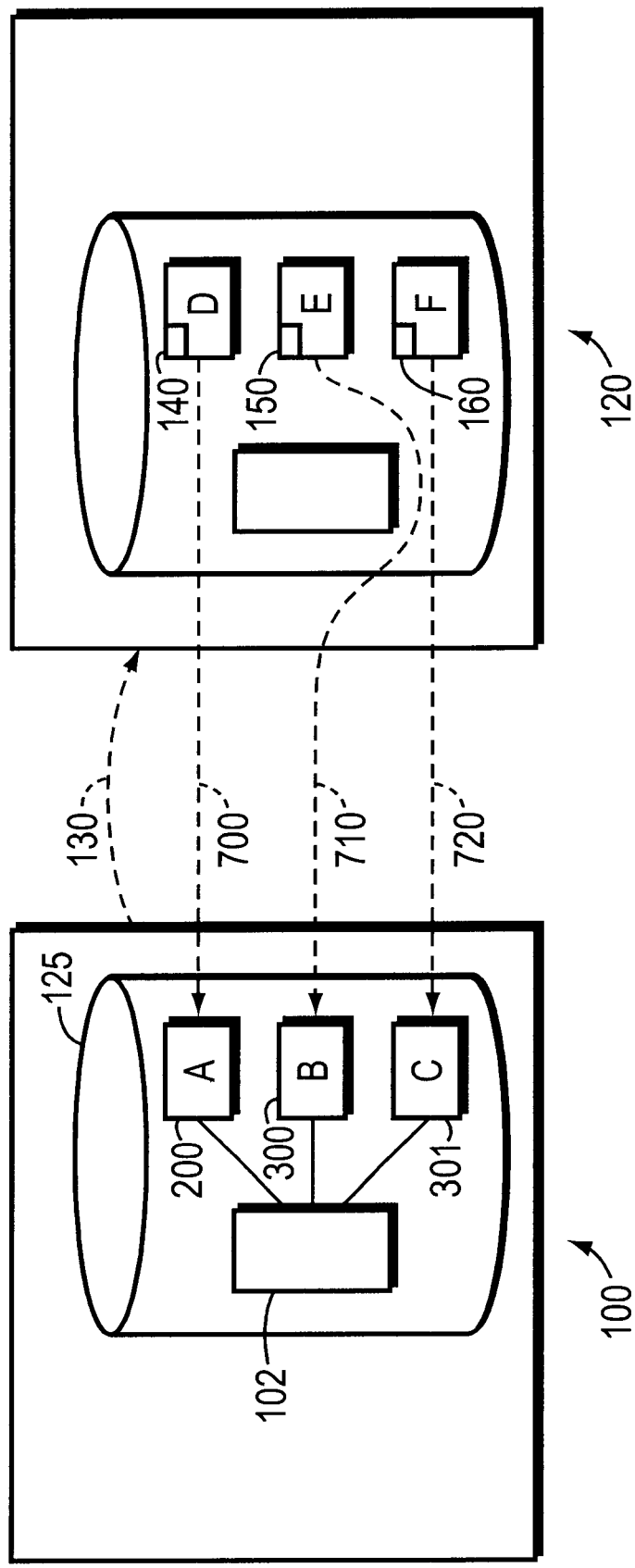
FIG. 1 is a general block diagram of a typical system in accordance with the invention.

In a traditional storage system, there can be an address translation from the logical address that the user requested to the physical location at which the data is actually stored. This translation occurs at many levels in the storage hierarchy. For purposes of understanding the invention, a storage hierarchy will be assumed to have an application layer, a filesystem layer, a logical volume manager, and a storage system in that order of hierarchy.

Typically, an application will open a file and view the file as a contiguous set of block addresses. The filesystem, however, can store the file in a set of disk-contiguous blocks using the addressing system that it "sees" from the logical volume manager. This type of address translation can occur at any level of the hierarchy. When the request makes it down to the lowest level, that being the disk drive of the storage system, it is already a physical address (although even at this level the disk drive may have the capability to remap the address to a different physical location to handle bad blocks, but that is not important to the invention).

In accordance with the invention, an indirect storage block is used. An indirect storage block is a block that redirects the storage system, upon reading the block, to read a different block in the storage system. Thus, in accordance with the invention, there are two different types of blocks in the storage system. There are "normal" blocks that is, blocks that contain user data, and there are indirect blocks, that is, blocks that contain an address to another block. In accordance with the invention, there is no limit to the number of indirect blocks that can reference each other, but care must be taken to ensure that a "reference loop" has not been created. This occurs, for example, when block A references block B, and block B references back to block A. (It is important to recognize also that many other references could have occurred between the first and the last reference.)

With this type of facility in place, data sharing can take place between systems that do not have compatible meta-data layouts because the data layout typically, in a filesystem, employs two types of data. The user "data" which is the informational content and the "meta-data" which describes how and where the data is stored. A typical example of "meta-data" includes a file name, a creation date, protect codes, and the locations of the physical blocks that contain the "informational data". Thus, the important item to share is the user "data", not the "meta-data".

In the past, if a file were created under, for example, the Solaris Unix filesystem (SU operating system) the filesystem could not be directly viewed by the Hewlett Packard Unix operating system (HP-UX). This incompatibility would cause unnecessary copies of the user data to be made or for a network filesystem to be used which can be accessed by both operating systems; that is, both operating systems could "see" the data. Both of these approaches inject inefficiencies into the process of being able to read the data by both systems.

The approach used in accordance with the invention is to use indirect storage blocks. Thus, in typical operation, referring to FIG. 1, a file is created under the first filesystem, for example, under Solaris Unix at 100. The file is created using a command such as DATA 1.DAT 200, 300, 301. A so-called INODE 102 is then created along with the files indicated at 200, 300 and 301, and labeled A, B, and C in block 100. The INODE, which contains the metadata, has a format which is not immediately important to the operation of the invention. However, the INODE, in one particular embodiment, can include the name of the file, the statistics describing the file, the nature of protection for the file, the byte length of the data, pointers to the data (for example 12 entries of, for example, 4K blocks of data) and references to yet additional INODES as they are needed. This meta-data describes all of the necessary information typically required in connection with that operating system. Thus, included within the INODE data will be pointers to each of the physical addresses for blocks A, B, and C so that the system knows where to look for the user data. If, for example, yet additional bytes of data were needed, beyond those normally available in a single INODE block, a last pointer of an INODE can point to an additional block of pointers, that is, additional INODE data, and an appropriate flag would be set in the various INODE blocks indicating the occurrence of such continuation blocks. This method of storing meta-data is well known in the art.

Once the first operating system sets up the blocks of user data A, B, and C, a second storage file is created under a second filesystem 120; however, before creating the second file, a special function is implemented to obtain the logical to physical mapping from the filesystem 100. This mapping represents the actual physical locations of the user "data" on storage 125. The location and format of the meta-data is not important to the second filesystem 120. A file is then created under the second filesystem 120, for example a Hewlett Packard Unix operating system, and is preallocated to be the same length as the first files A, B, and C. The data which enables the second filesystem to perform this function, is transmitted from the first system to the second system as indicated by network connection 130. The preallocated files labeled D, E, and F thus have the same length as the other files A, B, and C. Another special call is then made to retrieve the logical to physical mapping of the preallocated files. Each of these files will have a flag, 140, 150, 160, which will point to the corresponding physical locations of file A, B, and C. Thereafter, another special call is made to "link" the data blocks of the preallocated files D, E, and F, (that is to set the flags or pointers) to the data files of the existing files A, B, and C. After this step is completed, the same data can be accessed from each of the operating systems. As long as the meta-data is not changed for either file, there is a common area accessible by the two filesystems even though the meta-data formats of the two systems are incompatible.

Figure 2:
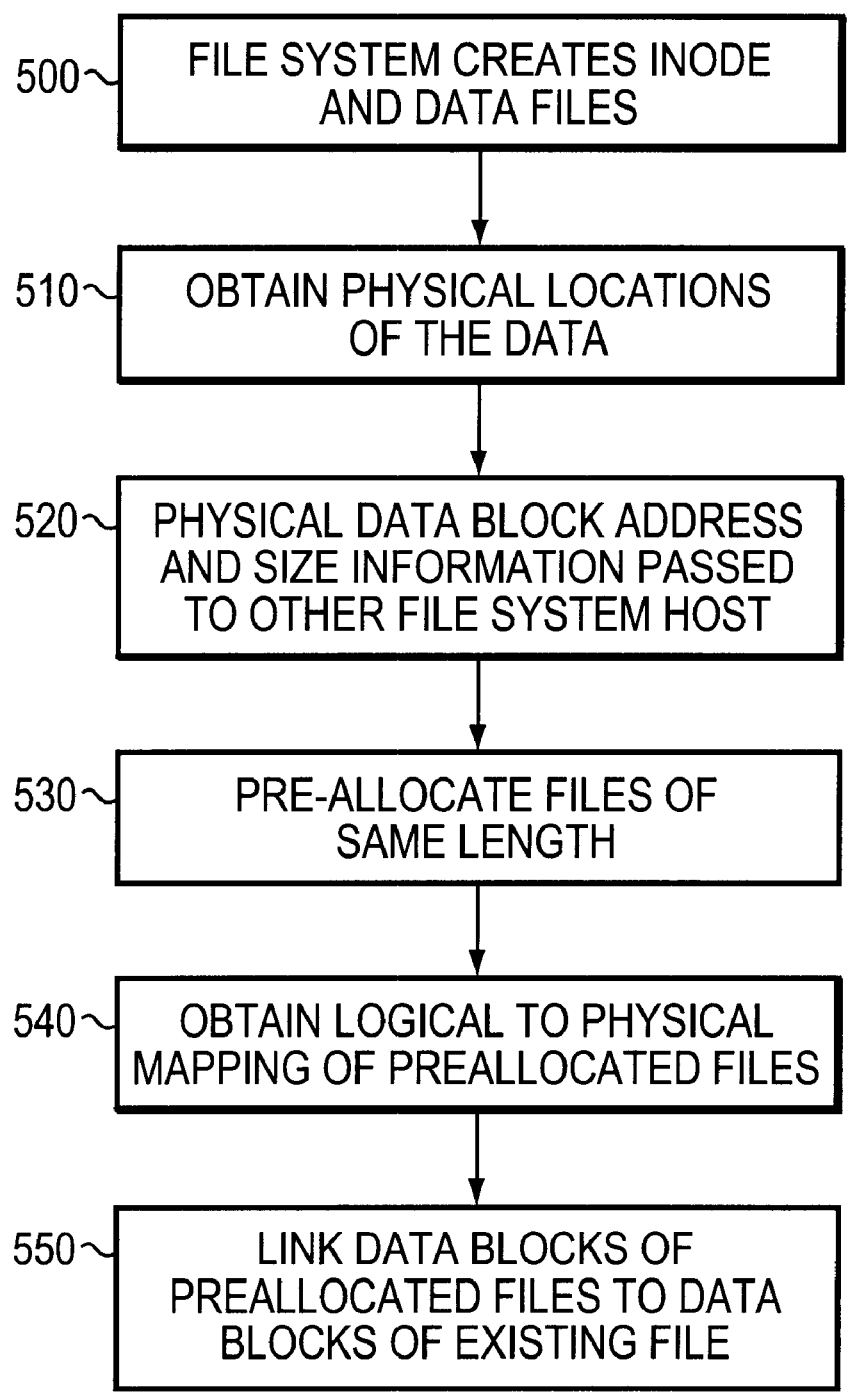
FIG. 2 is a flow chart illustrating operation of the systems in accordance with the invention.
Figure 3:
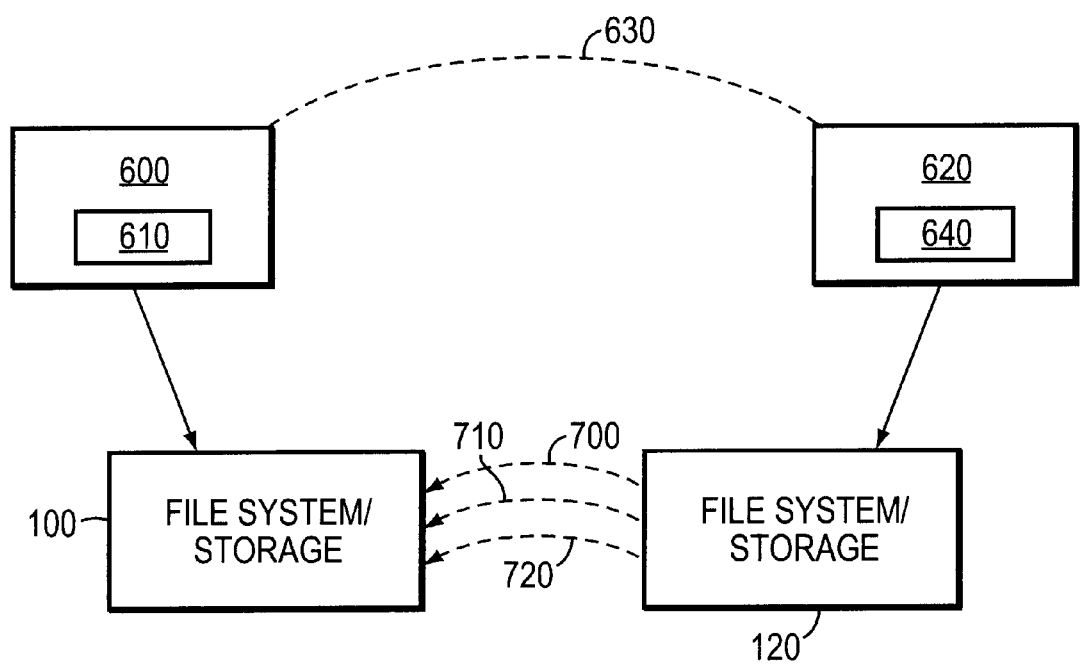
FIG. 3 is a more detailed block diagram of the file allocation system in accordance with the invention.

Thus, in operation, referring to FIG. 2, the first filesystem 100 creates an INODE file which contains the meta-data and points to the plurality of actual user data (informational) files in the system. This is indicated at 500, and is in response to a request from the host system 600 (FIG. 3) operating under a first operating system 610. The host system 600 then obtains the actual physical locations of the data through a logical to physical mapping (step 510). Note that the use of "data" by itself always refers to the user's actual data and does not include the meta-data. The information regarding these physical locations is then passed to host 620 over a communications path 630 and hence to filesystem 120 belonging to the host computer 620 operating, for example, under the same or a different operating system 640. This is indicated at 520. The second filesystem 120 then preallocates blocks of the same length as the files of system 100. Preferable, the preallocation step is performed at the filesystem manager without the actual transfer of user data (which in fact does not exist at preallocation time). This is indicated at 530. A special call is made to retrieve the logical to physical mapping of the preallocated files. This is indicated at 540. Finally, the data blocks of the preallocated files are linked to the data blocks of the already existing files, for example, using flags and pointers, as noted above, from block to block or file to file. This is indicated at 550, and by dashed lines 700, 710, 720 of FIGS. 1 and 3. As a result, a data call to either the filesystem 100 or filesystem 120 will result in reading user data located in the original block created by filesystem 100. The calls can be from hosts in the same or separate facilities having access to the mass storage device. The hosts can use the same or different operating systems, since the meta-data used by each operating system is not altered but only the block references are altered to enable a call from one operating system to be indirectly addressed to the correct files or data blocks originally set up by another operating system.

Figure 4:
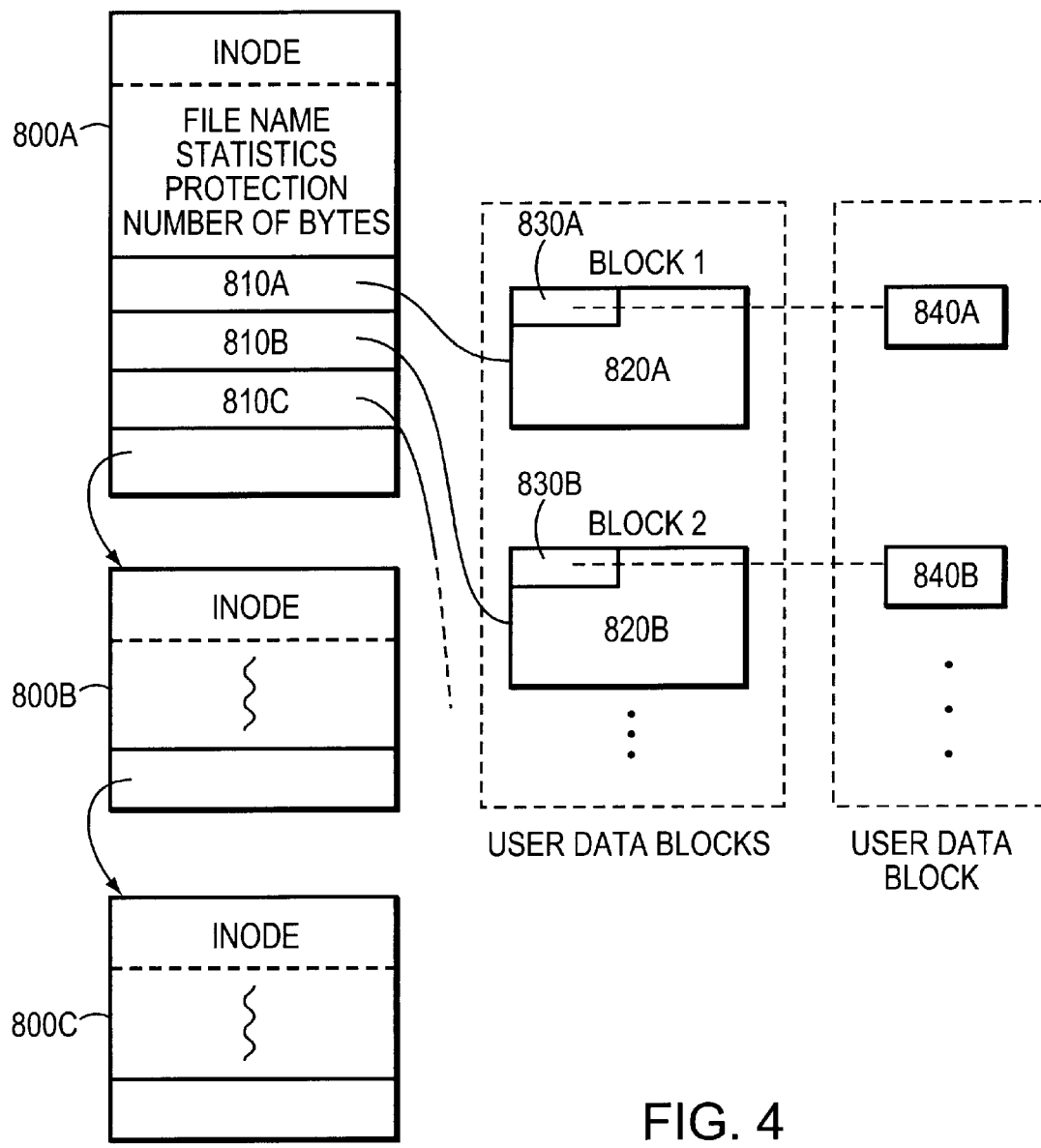
FIG. 4 is a more detailed table representation of the meta-data structure and user data blocks in accordance with the invention.

Referring now to FIG. 4, and considering in more detail the data file structures, when a new file is set up, whether through preallocation, or directly in the normal course, an INODE data block or blocks 800A, 800B, 800C, . . . will be set up. Each INODE block 800 will contain various data in a particular format including, for example, the file name, statistics relating to the file, the level of protection, the number of bytes, and a plurality of pointers 810A, 810B, 810C, . . . to user data blocks, the pointers each identifying the address of a data block in storage. If additional pointers must be provided in order to describe all of the data for that file, a last pointer of the INODE will be flagged and identify a new INODE, such as INODE 800B which will have the same structure as INODE 800A. This process continues until all of the data blocks for the file are identified by block address.

When the user data blocks are initially set up, each data block 820A, 820B, . . . , will typically be a fixed size, for example, 4K blocks. When the blocks are preallocated and will refer to another data block, a portion of a the block such as portions 830A, 830B, . . . will contain address data while the remainder of the block typically contains no data. The address data of portions 830 then refer to either other indirect storage blocks, as described above, or to the user data blocks as indicated at 840A, 840B, . . . Accordingly, at the so-called second host such as host 620 illustrated in FIG. 3, a call to read the data in a logical block associated with block 820A results in the filesystem retrieving the data in block 820A, recognizing that data is a pointer to another block of data and causing that second block of data to be read and sent to the host computer 620. In this manner, the separation between metadata blocks and user data blocks is maintained and provides a convenient, advantageous and efficient system for maintaining but one set of user data blocks such as blocks 840.

It is important that the user data blocks be separate from the meta-data blocks, as is the case for all of the filesystems with which the invention is useful. Further, in a large storage system such as the EMC Symmetrix storage systems, the files 820 and 840 may not be located on the same disk drive but can, using the flexibility and capability of the Symmetrix system, be located on different disk drives within the mass storage system. In other embodiments of the invention, it may be necessary to place the blocks 820 and 840 on the same disk drive in order to enable the disk drive controller to properly read the user blocks which are pointed to by the blocks 820.

Additions, subtractions, and other modifications of the preferred and described embodiment of the invention will be apparent to those of skill in this field and are within the scope of the following claims.

What is claimed is:

1. A method for accessing data files of a mass storage device from at least two different host computers having different operating system meta-data formats, comprising the steps of:
    creating, at first host computer, a first file having a first meta-data format and user blocks in said mass storage device,
    determining at the first host computer a logical to physical mapping of the user data blocks from said first file,
    creating at a second host computer a second file having a second meta-data format, said second file also having respective data blocks preallocated to be the same respective lengths as the user data blocks of the first file,
    retrieving the logical to physical mapping of the preallocated blocks, and
    linking the data blocks of the second file to the data blocks of the first file,
    wherein the first file is comprised in a second file system associated with a second type of operating system, the first type of operating system is different from the second type of operating system, and if a call is made to the second file system to read one of the blocks of the second file, a reading of an associated one of the blocks of the first file results.

2. The method of claim 1 further comprising the step of sending the logical to physical mapping of the first file to the second host computer over a communications channel.

3. The method of claim 1 wherein said linking step comprises the step of:
    placing pointers in said preallocated data blocks of the second file which point to the user data blocks of said first file.

4. The method of claim 1 wherein said creation of the second file, no data from the user data blocks of the first file is sent to the second host computer.

5. A method for indirectly accessing data blocks comprising the steps of:
    creating meta-data specifying a file,
    setting an indirect storage flag in said meta-data,
    writing in user data blocks an address identifying the corresponding indirectly stored data blocks, and
    accessing said indirectly stored data blocks using the address data,
    wherein the user data blocks and the meta-blocks and the meta-data file are comprised in a first file system associated with a first type of operating system residing in a first host computer, the indirectly stored data blocks are comprised in a second file system associated with a second type of operating system residing in a second host computer, the first type of operating system and the second type of operating system are different from each other, and the accessing of the indirectly stored data blocks is accomplished by making a call to the first file system to read the data file.

6. The method of claim 5 wherein said accessing step comprises the step of:
    reading pointers in said data blocks containing user data of said data file, wherein any remainder of said user data blocks contain no user data.

7. A system for use in accessing data files of a mass storage device, the system comprising:
    a first host computer that creates a first file having a first meta-data format and user data blocks in the mass storage device, the first host computer also determining a logical to physical mapping of the user data blocks from the first file,
    a second host computer that creates a second file having a second meta-data format, the second file also having respective data blocks that are preallocated to be the same respective lengths as the user data blocks of the first file, the second host computer also retrieving the logical to physical mapping of the preallocated blocks, and
    links between the data blocks of the second file and the data blocks of the first file,
    wherein the first file is comprised in a first file system of a first type of operating system, the second file is comprised in a second file system of a second type of operating system, the first type of operating system and the system type of operating system are different from each other, and if a call is made to the second file system to read one of the blocks of the second file, a reading of an associated one of the blocks of the first file results.

8. The system of claim 7, further comprising a communications channel via which the logical to physical mapping of the first file may be sent to the second host computer.

9. The system of claim 7, wherein the preallocated data blocks comprise pointers that point to the user data blocks of the first file.

10. The system of claim 7, wherein during creation of the second file by the second host computer, no data from the user data blocks of the first file is sent to the second host computer.

11. A system for indirectly accessing data blocks, the system comprising:
    a first host computer that creates meta-data specifying a data file, the meta-data including an indirect storage flag,
    user data blocks comprising address data identifying corresponding indirectly stored data blocks, and the first host computer accessing the indirectly stored data blocks using the address information, wherein the meat-data and the user data blocks are comprised in a first file system associated with a first type of operating system residing in the first host computer, the indirectly stored data blocks are comprised in a second file system associated with a second type of operating system residing in a second host computer, the first type of operating system and the second type of operating system are different from each other, and the first host computer accesses the indirectly stored data blocks in response to a call to the first file system to read the data file.

12. The system of claim 11, wherein the user data blocks comprise pointers to other blocks containing user data file, and any remainder of the user data blocks contains no user data.

* * * * *